United States Patent Office 3,535,134
Patented Oct. 20, 1970

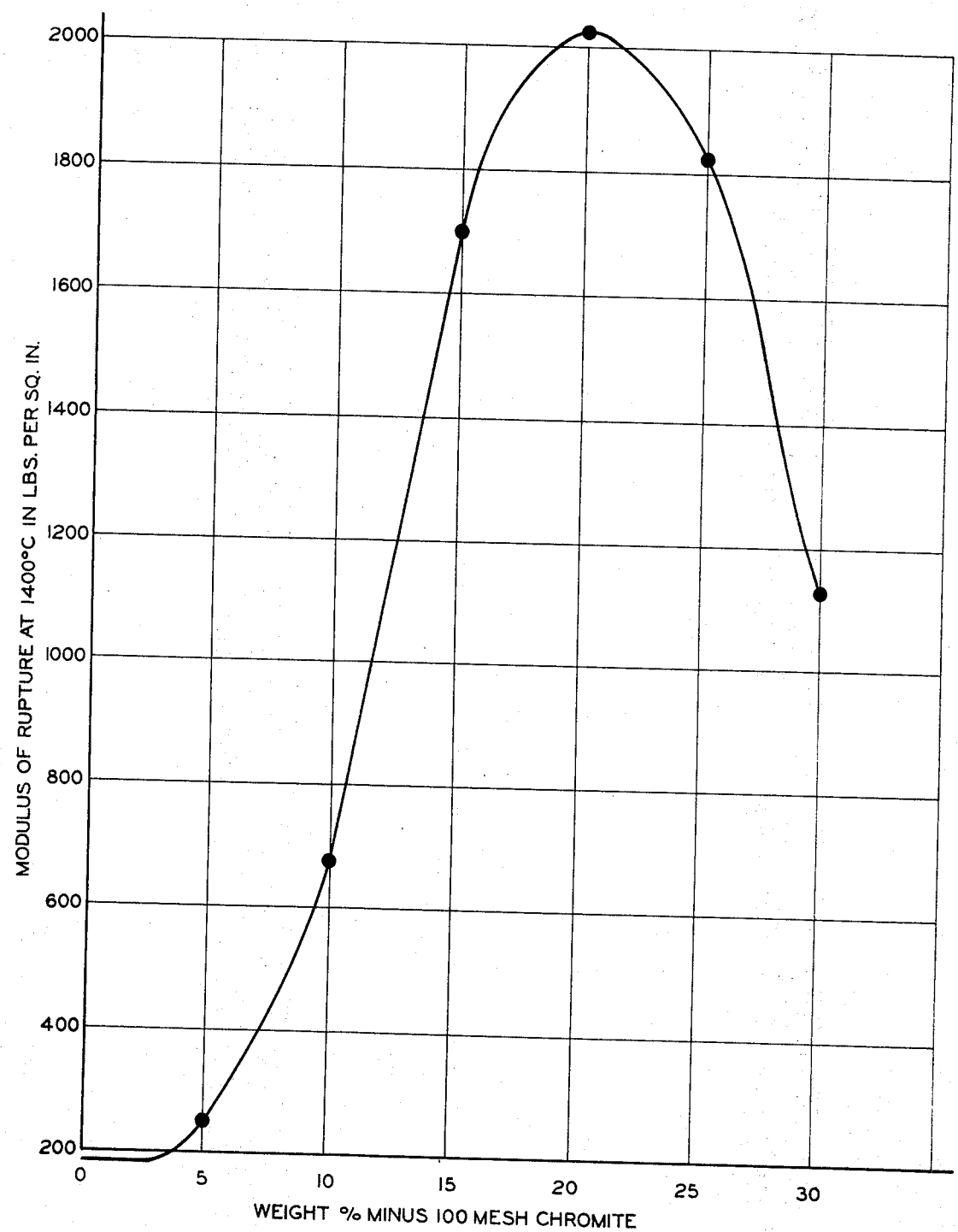

3,535,134
DIRECT BONDED PERICLASE CHROME BRICK
AND METHOD OF MAKING THE SAME
Jacques R. Martinet and Bernard D. McKenna, San Jose, Calif., assignors to Kaiser Aluminum & Chemical Corporation, Oakland, Calif., a corporation of Delaware
Filed Mar. 21, 1967, Ser. No. 624,894
Int. Cl. C04l 35/12
U.S. Cl. 106—59                                                    10 Claims

ABSTRACT OF THE DISCLOSURE

Direct bonded basic brick which are high in periclase and contain chromite, and which exhibit improved hot strengths, are produced by preparing a batch containing periclase grains in brickmaking size ranges including fines and from 15% to 25% of finely divided chromite ore substantially entirely passing 100 mesh of which at least 50% passes 325 mesh; incorporating a cold bonding agent, forming into shapes and firing to cause direct bonding of aggregate and chromite ore.

BACKGROUND OF THE INVENTION

This invention relates to the production of refractory burned shapes; and in a particular manner it relates to fired shapes of magnesia and chromite which exhibit high hot strength, and to a method of producing the same.

In the operation of metallurgical furnaces, such as steel making and other furnaces, the tendency is continuously to operate at higher temperatures, at more rapid heats, and under conditions which impose more severe strains upon the vessels of furnaces in which these operations are carried out. The refractories employed to line these furnaces have posed many problems, and the art is continuously seeking ways to improve the heat characteristics of such refractories. For instance, not only is cold crushing strength an important characteristic, but it is being recognized as more important that the refractory have good strength under conditions of high temperature operation. In addition, the resistance of the refractory or refractory shape to erosion by the furnace environment, such as slag, molten metal, and furnace dust or gases, is important.

SUMMARY OF THE INVENTION

It is a purpose of the present invention to provide periclase refractories, that is, particularly refractory burned shapes which are high in magnesium oxide, this substance having an extremely high fusion point, which exhibit high hot tensile strength along with good erosion resistance under operating conditions in a steel-making furnace, and which have also good spalling resistance under the conditions of furnace operation; and to produce these products in an inexpensive and practical manner.

According to the present invention, these objects and other objects are attained by preparing a bath which comprises periclase aggregate in brickmaking size ranges, from 15% to 25% by weight of finely divided chrome ore of particle sizing substantially entirely passing 100 mesh, and at least 50% passing through a 325 mesh screen, and from 1% to 5% of a chemical or cold bonding agent, forming such admixture into shapes and firing the same at high temperatures to obtain the fired shape or article of the desired properties. The periclase grain is of high purity and contains at least 95% magnesium oxide. In one especially advantageous mode of operation, the periclase grain contains at least 98% magnesium oxide.

It is an advantage of the present invention that a fired, high-periclase product is obtained which exhibits exceptionally good cold strength. It is a further particular advantage of the invention that a fired article can be made hereby which exhibits very high modulus of rupture, i.e. of over at least 1500 p.s.i., at a testing temperature of 1400° C. In addition, it has been found that brick made according to this invention can be stacked for 1700° C. firing and exhibit no deleterious cracking, bowing or other defects, but withstand such conditions well. It is a further advantage that fired articles according to this invention exhibit good spalling resistance, good creep resistance and excellent resistance to erosion by basic slags.

BRIEF DESCRIPTION OF THE DRAWING

In the annexed drawing, the figure shows a graphical representation of the high moduli of rupture at 1400° C. obtained according to the present invention.

DETAILED DESCRIPTION

The chromite which is useful in the present invention is any chromite ore which is of the desired purity. There can be employed chromite ore of Philippine, Transvaal, Turkish or other origin. Thus, beneficiated chromite ores of various types can be employed wherein the ore has been treated in any desired or known manner to reduce the silica content thereof.

The periclase grain material which is useful in the present invention can be prepared in a variety of ways. One suitable source is magnesium hydroxide recovered from sea water by treatment thereof with calcined dolomite to precipitate magnesium hydroxide, washing and filtering to recover a purified product, and then calcining and firing the recovered purified magnesium hydroxide to form deadburned magnesia. Small amounts of mineralizers can be added to facilitate dead burning, while retaining the desired purity of the magnesia or periclase. Such a periclase typically can contain 2.1% $SiO_2$, 1.1% $R_2O_3$, including $Fe_2O_3$, $Al_2O_3$, $Mn_2O_3$, $B_2O_3$ and $Cr_2O_3$, 1.1% CaO and 95.7% (by difference) MgO. There can also be used a periclase of still higher purity, e.g., containing 0.37% $SiO_2$, 0.26% $Fe_2O_3$, 0.05% $Al_2O_3$, 1.08% CaO, 0.13% $Cr_2O_3$, 0.03% $Na_2O$ and (by difference) 98.08% MgO. The periclase is employed in brickmaking sizes in order to provide good packing and density in the final product, in the manner well known to the art. However, from 10% to 20% of the periclase is of particle size passing 100 mesh, at least 50% and preferably from 55% to 70% of this material passing 100 mesh also passing through a 325 mesh screen.

In making up the refractory product, the sized periclase grain and the minus 100 mesh chromite are thoroughly mixed together and then there are added a chemical or cold bonding agent and a tempering amount of water, and the whole is again throughly mixed to form a uniform batch. Shapes can then be pressed or otherwise formed from the mass. In pressing brick or blocks from this refractory mixture, it is preferred that a pressure of at least 5,000 lbs. per square inch, preferably at least 10,000 lbs. per square inch, be employed. The bricks or shapes are dried and cured and are thereafter fired to a temperature of at least 1650° C. and especially to a temperature of at least 1700° C. The fired shapes so made exhibit excellent strength, and particularly they exhibit high modulus of rupture at a testing temperature of 1400° C.

As cold bonding agent, or compatible cold bond, there can be suitably employed a lignin material which not only serves as a good cold bond but which burns off during firing leaving in the refractory very little ash or solid material which is neither chromite nor magnesia. Another advantageous cold bonding agent is a water-soluble chromium compound, preferably chromic acid, $CrO_3$, which upon firing forms chromium oxide, $Cr_2O_3$, which is also a constituent of the starting material. Mixtures of these two bonding agents with each other are also useful. During firing, a ceramic bond is formed and in the fired product the chromite is in major part directly bonded to the periclase constituent without an intervening continuous silicate film. The siliceous components are disposed in discrete, discontinuous zones throughout the fired mass, desirably over 50% of the periclase particles being directly bonded to other periclase particles or to chromite particles.

In obtaining the results shown therein in the annexed drawing, a refractory batch is prepared by admixing 78% by weight of periclase grain of the following particle sizing: 10.5% passing 4 mesh and resting on 8 mesh, 23% passing 8 mesh and resting on 14 mesh, 23.5% passing 14 mesh and remaining on 48 mesh, 2.5% passing 48 mesh and remaining on 100 mesh, and 18.5% passing 100 mesh, 12.4% of the periclase (about 67% of the minus 100 mesh fraction) passing 325 mesh; 20% by weight of chromite of which 0.1% rests on 100 mesh, the remainder being finer than 100 mesh, 12.9% (64.5% of the chromite fraction) passing through 325 mesh. The chromite employed in this batch is Masinloc ore having the following typical analysis: 3.57% $SiO_2$, 15.84% $Fe_2O_3$, 28.46% $Al_2O_3$, 35.05% $Cr_2O_3$, 0.98% CaO, 16.10% MgO (by difference).

With the aforementioned refractory oxide components, there are then incorporated 0.75% lignin, 0.75% chromic acid, $CrO_3$ and 0.5% $ZrO_2$ in finely divided solid form. The $CrO_3$ is added as a solution in 1.25% by weight water (based on total dry weight of the batch) and thoroughly mixed with the refractory oxide particles. Then the lignin is incorporated in admixture with 1.25% by weight, based on the total dry batch, of water and is likewise thoroughly admixed. Bricks are formed from this batch by dry pressing under a pressure of 10,000 p.s.i. The bricks are dried at room temperature for about 6 hours, then at 150° C. for 16 hours. Bulk densities are determined on specimens of the brick so dried. A representative number of the brick are fired at 1700° C. and cold crushing strength and modulus of rupture at 1400° C. are determined on representatives fired brick samples.

To obtain the graphical data, a series of the above tests are run wherein the amount of minus 100 mesh chromite is varied in increments of 5%, i.e. by incorporating in the mix additions thereof of 5%, 10%, 15%, 20%, 25% and 30%. The remainder of the minus 100 mesh component is periclase in each instance. For example, where only 10% minus 100 mesh chromite is incorporated instead of substantially 20% as in the above-described batch, an additional 10% of minus 100 mesh periclase is substituted, etc. In a control batch, no minus 100 mesh chromite is added. Where the minus 100 mesh chromite is added, at least 50% passes 325 mesh.

As can be seen from the figure, the modulus of rupture at 1400° C. rises abruptly from 10% to 15% addition, reaches a peak at about 20% and falls off rapidly above 25%.

In one embodiment of this invention, to obtain a very good combination of properties there is incorporated in a batch 78% periclase in brickmaking size ranges and containing over 95% MgO, including 17.3% periclase passing 100 mesh. Of this minus 100 mesh material, about 65% passes 325 mesh. There is also incorporated 20% of chromite ore of particle size passing 100 mesh of which about 65% passes 325 mesh. As cold bonding agents there are added 0.75% lignin and 0.75% $CrO_3$; and there is also incorporated 0.5% finely divided zirconia, the batch being mixed and bricks formed thereafter as described hereinabove. The bulk density of the bricks after drying at room temperature is on an average 186 to 187 lbs. per cubic foot and after firing to 1700° C., 185.3 lbs. The cold crushing strength after such firing averages 13,068 p.s.i. In contrast thereto, bricks B are made in the same way except that there is incorporated 30% of the minus 100 mesh chromite described above, 65% passing 325 mesh, and 7.3% of the minus 100 mesh periclase described; and the cold crushing strength is only about 5000 p.s.i. The modulus of rupture at 1400° C. of the bricks A averages 2014 p.s.i. and that of bricks B, 1136 p.s.i. The modulus of rupture at 1260° C. of the brick made according to this invention averages over 2900 p.s.i. and has in some instances exceeded 3600 p.s.i. A still further batch of bricks C is made up in exactly the same manner except that there is incorporated 5% of the same minus 100 mesh chromite and 32.3% of the same minus 100 mesh periclase. The modulus of rupture of bricks C, at 1400° C., averages 237 p.s.i. although the cold crushing strength is 21,370 p.s.i. It can be seen that there is no apparent correlation between the cold crushing strength and the hot modulus; but the latter is desired to be high in order that the brick will withstand steel furnace operating conditions while the cold strength must be adequate for handling, placement, holding, etc. On the other hand, where a batch of bricks are made in the manner described above except that high purity chromium oxide, containing at least 97% $Cr_2O_3$ and of about one micron or less in diameter, is employed instead of tthe chromite ore and in an amount corresponding to the $Cr_2O_3$ content of that ore, i.e. 6.6% by weight, the hot strength is quite low. Upon testing, the modulus of rupture of these brick at 1260° C. was found to be 1317 p.s.i. and at 1400° C., 426 p.s.i., in contrast to 2027 p.s.i. and 1760 p.s.i., respectively, for a batch made at the same time according to the invention and containing chromite ore of the amount and sizes disclosed and claimed herein.

In another example there were admixed in one batch 78% by weight of periclase of the typical analysis given above, in the following size distribution: 32.3% passing 6 mesh and resting on 14 mesh, 23.0% passing 14 mesh and resting on 48 mesh, 4.4% passing 48 and resting on 100 mesh, and 17.5% passing 100 mesh including 62.7% of the minus 100 mesh also passing 325 mesh; and 20% of Masinloc chromite ore passing 100 mesh including 62.9% of the minus 100 mesh also passing 325 mesh. Another series of batches were made up in exactly the same way except that the same minus 100 mesh chromite is incorporated in amounts of, respectively, 0%, 2.5%, 5.0%, 10.0%, 15.0% and 30.0%. The remainder of the total amount of minus 100 mesh material is made up of the same periclase. That is to say, e.g., where 0% of this chromite is added, 37.5% of the aforesaid minus 100 mesh periclase is employed; and where 30.0% of the chromite is added, 7.5% of such periclase is used. As bonding materials, there are added in each batch 0.75% lignin and $CrO_3$ in water and as previously described. Each batch is formed into bricks, dried and fired as described above. The results as to density after drying at 150° C. and modulus of rupture at 1400° C. after firing at 1700° C. to effect direct bonding are shown in Table I.

TABLE I

| Percent by wt. of −100 mesh chromite | Density (150° C.) lbs. per cu. ft. | MOR—1400° C., p.s.i. |
|---|---|---|
| 0.0 | 179.7 | 109 |
| 2.5 | 179.7 | 77 |
| 5.0 | 180.0 | 151 |
| 10.0 | 181.0 | 520 |
| 15.0 | 182.3 | 994 |
| 20.0 | 183.1 | 1,079 |
| 25.0 | 184.2 | 1,044 |
| 30.0 | 185.3 | 852 |

It can be seen that the curve follows the direction of that shown in the figure and the same relationships are found with these percentage chromite ranges, as to MOR values.

Bricks made and fired according to this invention and containing from 15% to 25% minus 100 mesh low silica chromite, of which at least 50% and preferably 60–70% passes 325 mesh, along with a cold bonding agent and about 0.25% to 0.75% of a suitable direct-bonding catalyst, such as zirconia, satisfy these conditions and especially provide excellent modulus of rupture at 1400° C., especially of at least 2000 p.s.i. after firing at 1700° C. To obtain the highest strengths and optimum combination of properties in these brick, it has been found advantageous to incorporate in the batch about 78% periclase containing at least 95% MgO and in brickmaking size ranges, including about 12% passing 100 mesh of which about 68% passes 325 mesh, and about 20% minus 100 mesh chromite of which about 68% passes 325 mesh. The remainder to 100% is lignin or chromic acid, $CrO_3$, or both, and about 0.5% zirconia. However, the benefits of the invention are also obtained with all of the compositions shown herein.

In lining a furnace, for example, it will be understood that the fired product according to this invention can constitute the working or wear surface, i.e. as exposed to the heat of the furnace, and the back-up material can be of another composition.

In conformity with common practice in reporting chemical analyses of refractory materials, in the specification and claims the proportions of the various chemical constituents present in a material are given as though these constituents were present as the simple oxides. Thus, the magnesium constituent is referred to as magnesium oxide or MgO, the silicon content as silica, silicon dioxide or $SiO_2$, and so on for other elements reported, although the silica or chrome or other element or oxide may be present in combination with a very small proportion of the MgO, or with another component. That is to say, the term "2.1% $SiO_2$," or "of silicon expressed or calculated as $SiO_2$" is intended to mean that a chemical analysis of the material referred to would show the silicon content as $SiO_2$, although it may be present as a calcium silicate or in some other combination. In mixing batches according to this invention, a tempering amount of water or liquid is used according to well-known good practice in this art, e.g., 2 to 3.5% or as desired. By a "compatible cold bond" is meant one which upon firing leaves no substantial amount of material not present in the starting refractory oxide components. Percentages given in this specification and in the appended claims are percentages by weight unless otherwise indicated. Particle sizes given are those of Tyler screens as set forth, e.g., in "Chemical Engineers Handbook", John H. Perry, Editor-in-Chief, Fourth edition, McGraw-Hill Book Company, 1963, at page 21–51. The modulus of rupture is determined according to A.S.T.M. Standards, Designation C133–55, except that the specimens are tested in a furnace which maintains them at a temperature of 1260° C. or 1400° C., or as indicated.

Having now described the invention, what is claimed is:

1. Method of producing refractory shapes of improved hot strength which comprises admixing:
   (a) periclase particles containing at least 95% MgO, in brickmaking size ranges, from 10% to 20% thereof passing 100 mesh,
   (b) from 15% to 25% finely divided chromite substantially entirely passing through a 100 mesh screen and at least 50% passing 325 mesh,
   (c) from 1% to 5% of a cold bond,
   (d) forming into shapes and
   (e) firing said shape at a temperature of at least 1650° C. to obtain a fired article exhibiting direct bonding of periclase particles to said chromite and to other periclase particles without intervening silicate film.

2. Method as in claim 1 wherein there is also incorporated from 0.25% to 0.75% zirconium expressed as $ZrO_2$.

3. Method as in claim 2 wherein said shape is fired at a temperature of at least 1700° C. to obtain an article exhibiting a modulus of rupture at 1400° C. of at least 2000 p.s.i.

4. Method as in claim 1 wherein of said minus 100 mesh periclase at least 50% passes 325 mesh.

5. Method as in claim 2 wherein about 68% of said minus 100 mesh periclase and about 68% of said minus 100 mesh chromite pass a 325 mesh screen.

6. Refractory batch for forming into shapes and firing to obtain a direct bonded high strength refractory shape consisting essentially of periclase in brickmaking size ranges, including from 10% to 20% of particles passing a 100 mesh screen, from 15% to 25% finely divided chromite substantially entirely passing a 100 mesh screen and of which at least 50% passes through a 325 mesh screen, and from 1% to 5% of a cold bond.

7. Batch as in claim 6 wherein from 55% to 70% of said periclase particles passing a 100 mesh screen pass through a 325 mesh screen and from 60% to 70% of said finely divided chromite passes 325 mesh.

8. Batch as in claim 7 containing 0.25% to 0.75% zirconium expressed as zirconia.

9. Fired refractory shape consisting essentially of periclase particles in brickmaking size ranges, including 10% to 20% of particles passing 100 mesh, and from 15% to 25% finely divided chromite passing 100 mesh and at least 50% passing 325 mesh, at least a major portion of said chromite being directly bonded to particles of said periclase without intervening siliceous film.

10. Fired refractory shape as in claim 9 containing also from 0.25% to 0.75% zirconia.

References Cited

UNITED STATES PATENTS 3,309,209   3/1967   Martinet et al. _____ 106—57

FOREIGN PATENTS 1,014,626   12/1965   Great Britain.

JAMES E. POER, Primary Examiner

U.S. Cl. X.R.

106—57

UNITED STATES PATENT OFFICE
CERTIFICATE OF CORRECTION

Patent No. 3,535,134          Dated October 20, 1970

Inventor(s) Jacques R. Martinet and Bernard D. McKenna

It is certified that error appears in the above-identified patent and that said Letters Patent are hereby corrected as shown below:

Column 1, line 59, "bath" should be -- batch --;

Column 3, line 40, "representatives" should be -- representative

Column 3, line 70, "185.3 lbs." should be -- 185.3 lbs. per cubic foot --;

Column 4, line 42, "30.0%" should be -- 25.0% and 30.0% --; and

Column 4, line 49, "and $CrO_3$" should be -- and 0.75% $CrO_3$ --.

Signed and sealed this 18th day of May 1971.

(SEAL)
Attest:

EDWARD M. FLETCHER, JR.　　　　　　　WILLIAM E. SCHUYLER, JR.
Attesting Officer　　　　　　　　　　Commissioner of Patents